United States Patent [19]

Diamond et al.

[11] Patent Number: 4,464,500
[45] Date of Patent: Aug. 7, 1984

[54] POLYMERIC COMPOSITION AND USE THEREOF

[76] Inventors: Jeffrey Diamond, 3474 S. Ocean Blvd., Palm Beach, Fla. 33480; David S. Winkler, 4030 N. Firestone, Wooster, Ohio 44691

[21] Appl. No.: 521,768

[22] Filed: Aug. 9, 1983

[51] Int. Cl.³ .......................... C08K 5/17; C08L 45/00
[52] U.S. Cl. .................... 524/258; 525/211; 525/237
[58] Field of Search ................ 525/211, 237; 524/258

[56] References Cited

U.S. PATENT DOCUMENTS

| | | | |
|---|---|---|---|
| 3,904,470 | 9/1975 | Fukuki et al. | 525/211 |
| 3,975,335 | 8/1976 | Tiessens et al. | 525/211 |
| 4,046,840 | 9/1977 | Carman et al. | 525/211 |
| 4,341,667 | 7/1982 | Lai et al. | 525/211 |

*Primary Examiner*—J. Ziegler
*Attorney, Agent, or Firm*—Pollock, Vande Sande & Priddy

[57] ABSTRACT

A polymeric composition containing butyl rubber, and/or bromobutyl rubber, and/or chlorobutyl rubber; a EPDM polymer, and polyethylene; and use thereof to prepare molded, cured, flexible bulbs are provided.

22 Claims, No Drawings

POLYMERIC COMPOSITION AND USE THEREOF

DESCRIPTION

1. Technical Field

The present invention is concerned with polymeric compositions which are capable of being cured to provide flexible products which are impervious to vapors from organic solvents and resistant to swelling when in contact with organic solvents. In particular, the present invention is concerned with polymeric compositions which can be cured and molded and which are especially useful in producing bulb-like products. Such bulb-like products can be used in conjunction with an eye dropper and cap combination to maintain the desired liquid composition within a container or bottle without loss of solvent through vaporization, and which can be used to transfer material via the eye dropper in small controllable, measureable quantities.

2. Background Art

Compositions, to be suitable for sealing or preventing the evaporation of volatile organic diluents from a container, must have excellent resistance to vapor transmission. Moreover, such compositions, because they inevitably come in contact with the organic materials over relatively long periods of time, must be resistant to being degraded by the organic materials in the container. In fact, such compositions need to be resistant to swelling when in contact with organic diluents.

One particular application of a suitable polymeric composition for sealing organic diluents present in a container would be as a bulb-like structure for an eye dropper to be used in conjunction with a container containing materials such as fingernail lacquer or polish. The desirability for such a product would be the ability to provide a kit containing a limited number of different fingernail polish colors, a color chart, and a measuring container whereby a large number of desired colors could be accurately obtained. The eye dropper arrangement would be used to accurately transfer material from individual bottles to a graduated measuring bottle in order to mix exact quantities of different colors according to a preselected color chart, to obtain the desired color. However, to obtain a composition suitable for preparing a bulb to be used in such an environment, in addition to the necessity of possessing the above-discussed properties, must also be sufficiently flexible and durable to be squeezable to create the needed pressure differential in order to transport the fingernail lacquer via the eye dropper. Furthermore, the composition must also be readily moldable and sufficiently inexpensive as to be practical for such an application.

It would also be highly desirable that the molded bulb have a pleasant appearance. Moreover, none of the materials in the composition should exude or bleed out of the composition into the fingernail polish, thereby changing the color or other properties of the polish. Accordingly, it is readily apparent that a material, to be suitable for such purpose, must possess a number of critical properties and characteristics which are quite difficult to achieve. This problem is made more acute when the object is to obtain a relatively inexpensive material.

SUMMARY OF INVENTION

The present invention is concerned with a polymeric composition which comprises:
(a) about 55 to about 65 parts by weight of a rubber selected from the group of butyl rubber, bromobutyl rubber, chlorobutyl rubber, or mixtures thereof;
(b) about 35 to about 45 parts by weight of a EPDM polymer; and
(c) about 25 to about 35 parts by weight of an amorphous polyethylene.

The above amounts by weight are based upon 100 parts by weight of the total of the (a) and (b) components in the composition.

The present invention is also concerned with a flexible polymer bulb obtained by molding and curing the composition defined hereinabove.

BEST AND VARIOUS MODES FOR CARRYING OUT INVENTION

The compositions of the present invention, when cured, are sufficiently resistant to vapor transmission and resistant to degradation and swelling by the organic deluents to which they are contacted to be suitable as a bulb-like sealant for containers containing fingernail lacquer or polish. Such diluents include aromatic organic compounds such as toluene and esters such as $C_1$-$C_4$ alcohol esters of acetic acid including ethyl acetate and butyl acetate. Moreover, the compositions of the present invention, when cured, are adequately flexible and are moldable and are of a competitive price.

The polymer compositions of the present invention contain a butyl-type rubber which can be butyl rubber, bromobutyl rubber, chlorobutyl rubber, or mixtures thereof. The rubber employed should be one having relatively low unsaturation and relatively high molecular weight, as determined by Mooney viscosity. For instance, the unsaturation of the rubber is generally about 1 mole percent, or less. An especially preferred rubber employed is a butyl rubber available under the trade designation "Polysar 111", available from Polysar. According to the manufacturer, this butyl rubber has an unsaturation content of about 0.7 mole percent and a Mooney viscosity of ML(1+12, 257° F.) of 54.

The compositions of the present invention also contain a EPDM polymeric component. EPDM polymeric component refers to polymers of ethylene, a higher α-olefin such as propylene, and a polyene. The preferred EPDM polymers employed according to the present invention, are non-crystalline and are copolymers of ethylene, propylene, and an alkenyl norbornene such as ethylidene norbornene.

The EPDM polymers usually contain about 65 to about 85 percent by weight of ethylene, about 5 to about 35 percent by weight of propylene, and about 0.2 to about 10 percent by weight of the polyene monomer. Alkenyl norbornenes, other than ethylidene norbornene, which can be present, include 5-butylidene-2-norbornene, 2 methallyl-5-norbornene, 2 isopropenyl-5-norbornene, 5-(1,5-hexadienyl)-2-norbornene, and 5-(3,7-octadienyl) -2-norbornene.

The EPDM polymers employed have a low unstretched crystallinity ranging from 0 to about 8 percent, based upon the EPDM polymer. The unstretched crystallinity of the EPDM polymer can be measured using an X-ray technique or DSC technique (Differential Scanning Colorimetry). Measuring percent crystallinity of polymers via X-ray diffraction is a known technique (see Natta, et al., Atti Accad-Nazi. Lincei. Rend. (8) 8 11 (1957)).

The method used consists of pressing a 0.02 inch thick film of the EPDM polymer at 120° C. and 20,000 pounds pressure. The films are quickly cooled (quenched) and then annealed at room temperature for at least 24 hours. The thin films are then mounted and exposed to X-rays, and a diffraction scan is made across an angular range. Using a diffractometer, a plot of the angular distribution of the radiation scattered by the film is made. This plot is seen as a diffraction pattern or sharp crystalline peak superimposed upon an amorphous peak. The quantitative value of percent crystallinity is obtained by dividing the crystalline diffractionary of the plot by the total diffraction area of the plot.

Moreover, the EPDM polymers employed, according to the present invention, are high molecular weight elastomers. Such polymers have a dilute solution viscosity (DSV) of about 1.3 to about 4.5 measured at 25° C. as a solution of 0.1 gram of polymer per deciliter of toluene. The raw polymer has a tensile strength of about 300 psi minimum to about 1800 psi, and more typically, from about 600 psi to about 1600 psi, and an elongation at break of at least about 600 percent.

The preferred EPDM polymers, employed according to the present invention have a Mooney viscosity of ML(1+8, 260° F.) of about 65 to about 75. A particular EPDM polymer employed according to the present invention is available under the trade designation "EPDM 5600" from Exxon.

The other polymeric component employed according to the present invention, is an amorphous polyethylene. It is necessary that the polyethylene be amorphous and have a high melt index or high molecular weight in order to achieve all of the required properties of the final cured product, as discussed hereinabove. A typical, suitable polyethylene is available from Allied Chemical under the trade designation "9A Polyethylene".

The compositions contain the butyl rubber type component, discussed hereinabove, in amounts of about 55 to about 65 parts by weight; the EPDM polymer in amounts of about 35 to about 45 parts by weight; and the polyethylene in amounts of aobut 25 to about 35 parts by weight. These amounts by weight are based upon 100 parts by weight of the total of the butyl-type rubber and EPDM polymer contained in the composition.

In order to cure the polymeric composition of the present invention, it is preferred to employ a sulphur type curing or vulcanizing system. The type and level of curatives for the sulphur cure system are used in an amount or level necessary to provide the desired properties and state of cure with sufficient scorch life to permit the necessary processing. For sulphur curing, sulphur or sulphur furnishing compounds can be employed. The amount of sulphur is generally about 1.25 to about 1.75 parts by weight and, most preferably, about 1.5 parts by weight based upon 100 parts of the total of the butyl-type rubber and the EPDM polymer in the composition.

In addition, the compositions desirably contain cure activators and cure accelerators. Examples of such include zinc oxide, zinc stearate, stearic acid, 2-mercaptobenzothiazole, tetramethylthiuram disulfide, dithiocarbamate-thiazole blend, tellurium diethyldithiocarbamate, dipentamethylene thiuram hexasulfide, zinc dimethyldithiocarbamate, zinc salt of 2-mercaptobenzothiazole, tetramethylenethiuram monosulfide, tetraethylthiuram disulfide, dipentamethylene thiuram tetrasulfide, benzothiazyl disulfide, zinc diethyldithiocarbamate, zinc dibutyldithiocarbamate, 4,4 dithiodimorpholine, and N-cyclohexyl-2-benzothiazole sulfenamide.

In a preferred embodiment, according to the present invention, a cure accelerator containing about 4 to 6 parts and preferably, 5 parts by weight of zinc oxide and about 1.5 to about 2.5 parts by weight of stearic acid per 100 parts by weight of the total of the butyl-type rubber and EPDM polymer in the composition are employed. In addition, in the preferred aspect of the present invention, a 2-mercaptobenzothiazole cure accelerator, in amounts of about 1 to about 1.5 parts by weight and most perferably, about 1.25 parts by weight per 100 parts total of the butyl-type rubber and EPDM polymer employed in the composition are used.

The composition also desirably, but not necessarily, contains an antioxidant. Examples of such include di-β-naphthyl-p-phenylenediamine; phenyl-β-naphthylamine; dioctyl-p-phenylenediamine; N-1,3-dimethylbutyl-N-phenyl-p-phenylenediamine; 4-isopropylamine diphenylamine; 2,6-di-t-butyl paracresol; 2,2'-methylenebis-(4-ethyl-6-t-butyl phenol); 2,2'-thiobis-(4-methyl-6-t-butyl phenol); bisphenol-2,2'-methylenebis-6-t-butyl-4-ethylphenol; 4,4'-butylidenebis-(6-t-butyl-m-cresol); 2-(4-hydroxy-3,5-5-butylaniline); -4,6-bis(octylthio)-1, 3,5-triazine, hexahydro-1,3,5-tris-β-(3,5-di-t-butyl-4-hydroxyphenyl) propionyl-s-triazine; tris(3,5-di-t-butyl-4-hydroxybenzyl) isocyanaurate, tetrakis-methylene-3-(3',5'-di-t-butyl-4'-hydroxyphenyl) propionate methane; distearyl thiodipropionate; dilauryl thiodipropionate; and nonylatedphenyl phosphite. The preferred antioxidants are the amine antioxidants and most preferably, octylated diphenylamines such as Agerite Stalites, available from R. T. Vanderbilt.

The amount of such antioxidant is about 1 to about 1.25 parts by weight per 100 parts of the butyl-type rubber and EPDM polymer in the composition.

Moreover, the composition can contain other compounding ingredients such as fillers and optical brighteners. Preferred optical brighteners include $TiO_2$ and $CaCO_3$ in amounts of 0 to 25 parts by weight and preferably, about 15 to about 25 parts by weight based upon 100 parts of the butyl-type rubber and EPDM polymer in the composition.

The compositions of the present invention can be compounded on conventional rubber compounding equipment such as a two-roll mill. It is preferred to master-batch the polymers (butyl-type rubber, EPDM polymer, and polyethylene) to obtain a homogeneous mixture by admixing under temperatures of about 220° F. Then the other ingredients are added to the polymeric blend employing a two-roll mill.

The compositions can be cured by heating at elevated temperatures such as at about 310°-340° F. and preferably about 320° F. for about 8-35 minutes and preferably about 17½ minutes.

The following non-limiting example is presented to further illustrate the present invention.

About 60 parts by weight of Polysar 111, about 40 parts by weight of EPDM 5600, and about 30 parts by weight of 9A Polyethylene are admixed in a Bradbury mixer at a temperature of about 220° F. The mixture is agitated for about 2½ minutes until a homogeneous blend is obtained. Next, about 5 parts by weight of zinc oxide, about 1.5 parts by weight of stearic acid, about 1.25 parts by weight of 2-mercaptobenzothiazole (Captax), about 1.5 parts by weight of sulphur, about 1 part by weight of Agerite Stalite S, and about 20 parts by weight of TiO$_2$ are blended in and the composition is then transferred to a two-roll mill wherein a homogeneous moldable composition is prepared.

The composition was tested for resistance to vapor transmission and resistance to swelling when in contact with fingernail lacquer or polish by providing a tensile strength slab (6 inches×6 inches×0.075 inches) cured at about 320° F. for about 17.5 minutes. The composition has a Shore A hardness of about 35. After curing, round discs are cut out from the slab with a cork bore. These discs are used as seals for 2 ounce bottles which have a weighed amount of nail polish lacquer plus a small section of the rubber compound. The bottles are then sealed. The weight-loss is monitored by reweighing the bottles each day. The tests were carried out at normal room temperature.

No discoloration of the lacquer was observed after six days.

In addition, the above compositions are placed in compression or transfer molds to provide bulb-like structures which can be used as bulbs for eye droppers, as discussed hereinabove.

What is claimed is:

1. A polymeric composition comprising:
   (A) about 55 to about 65 parts by weight of a butyl-type rubber selected from the group of butyl rubber, bromobutyl rubber, chlorobutyl rubber, or mixtures thereof;
   (B) about 35 to about 45 parts by weight of an ethylene, a higher α-olefin and a polyene polymer; and
   (C) about 25 to about 35 parts by weight of amorphous and have a high melt index or high molecular weight polyethylene; wherein the above amounts by weight are based upon 100 parts by weight of the total of (A) and (B).

2. The composition of claim 1 wherein said rubber is butyl rubber.

3. The composition of claim 2 wherein said butyl rubber has an unsaturation content of about 1 mole percent or less.

4. The composition of claim 2 wherein said butyl rubber has a Mooney viscosity of ML(1+12, 257° F.) of 54.

5. The composition of claim 1 wherein said polymer is a copolymer of ethylene, propylene, and an alkenyl norbornene.

6. The composition of claim 5 wherein said alkenyl norbornene is ethylidene norbornene.

7. The composition of claim 5 wherein the polymer (B) contains about 65 to about 85 percent by weight of ethylene, about 5 to about 35 percent by weight of propylene, and about 0.2 to about 10 percent by weight of said alkenyl norbornene.

8. The composition of claim 7 wherein said polymer (B) is a non-crystalline polymer.

9. The composition of claim 6 wherein said polymer (B) has a Mooney viscosity of ML(1+8, 260° F.) of about 65 to about 75.

10. The composition of claim 1 which rubber (A) contains about 60 parts by weight of said rubber, about 40 parts by weight of said EPDM polymer, and about 30 parts by weight of said polyethylene.

11. The composition of claim 1 which additionally contains sulphur or sulphur furnishing compound in an amount sufficient to cause curing of the compositiion.

12. The composition of claim 11 which contains about 1.25 to about 1.75 parts by weight of sulphur based upon the total of the butyl-type rubber and the polymer (B) in the composition.

13. The composition of claim 11 which includes about 1.5 parts by weight of sulphur based upon 100 parts by weight of the total of the butyl rubber and polymer (B) in the composition.

14. The composition of claim 11 which includes about 1.5 parts by weight of sulphur based upon 100 parts by weight of the total of the butyl rubber and polymer (B) in the composition.

15. The composition of claim 11 which additionally contains about 4 to about 6 parts by weight of zinc oxide and about 1.5 to about 2.5 parts by weight of stearic acid.

16. The composition of claim 15 which contains about 5 parts by weight of zinc oxide and about 2 parts by weight of stearic acid.

17. The composition of claim 15 which additionally contains 2-mercaptobenzothiazole in amounts of about 1 to about 1.5 parts by weight based upon the total of 100 parts total of the butyl-type rubber and polymer (B) in the composition.

18. The composition of claim 17 which additionally contains an antioxidant.

19. The composition of claim 18 wherein said antioxidant is about 1 to about 1.25 parts by weight of octylated diphenylamine per 100 parts of the total of the butyl-type rubber and the EPDM polymer (B) in the composition.

20. The composition of claim 19 which additionally contains an optical brightener.

21. The composition of claim 20 wherein said optical brightener is about 15 to about 25 parts by weight of TiO$_2$ per 100 parts by weight of the butyl-type rubber and the polymer (B) in the composition.

22. A flexible bulb obtained from molding and curing the polymeric composition of claim 1.

* * * * *